S. GODFREY.
Grain Drier.
No. 53,293.
Patented March 20, 1866.
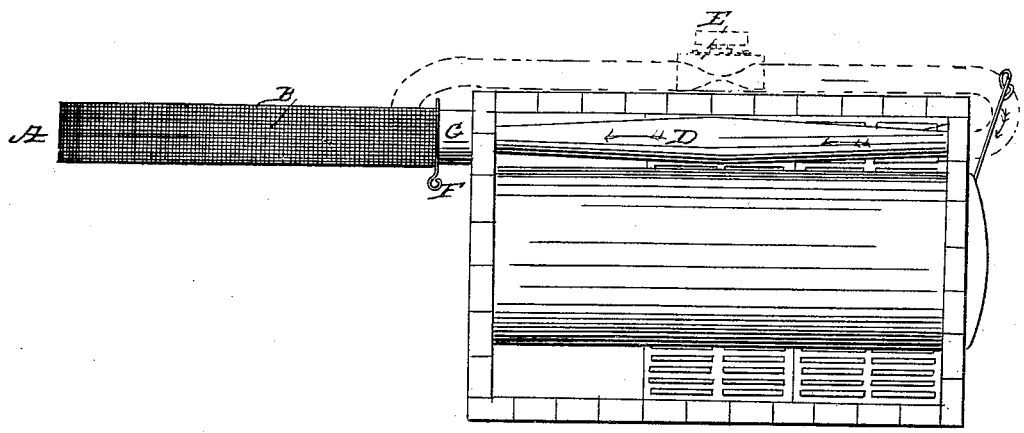
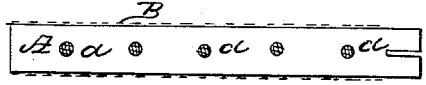
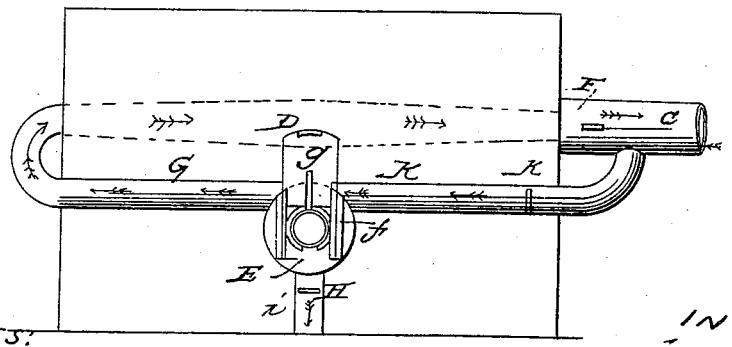

UNITED STATES PATENT OFFICE.

SOLOMON GODFREY, OF PEORIA, ILLINOIS.

GRAIN-DRIER.

Specification forming part of Letters Patent No. 53,293, dated March 20, 1866.

*To all whom it may concern:*

Be it known that I, SOLOMON GODFREY, of Peoria, in the county of Peoria and State of Illinois, have invented a new and Improved Mode of Drying Grain; and I do hereby declare that the following is a full, clear, and exact description thereof, reference being had to the accompanying drawings, and to the letters of reference thereon.

Figure 1 is a top view of an open furnace, in which the pipe is shown for heating the air to be used in my method. Fig. 2 is a section of my wire-gauze-covered pipe, in contact with which the grain to be dried is placed; and Fig. 3 is a side elevation, showing the fan and pipes for alternating the draft of air through the drying-chamber.

It is the object of my invention to apply hot air directly to the grain to be dried and diffuse it through masses in bulk, and when dried to cool it rapidly for shipment by cutting off the hot air and forcing or drawing cold air through the mass of grain, using but one fan or bellows for both purposes; and to this end my invention consists, first, in protecting the pipes for grain-drying chambers with wire-gauze so placed that the grain cannot come directly in contact with the pipes, and that the interstices in the gauze will serve to diffuse and moderate the temperature of the hot air used in drying the grain, and will permit the withdrawal of the air from the drying-chamber by suction through the grain into the drying-pipes, or allow a current of cold air to be driven through the grain; second, in the employment of an air-heating pipe in an ordinary furnace, of larger diameter in the center than at the ends, to regulate the degree of heat the air shall receive in the pipe; and, third, in so arranging a fan or bellows that when driven in one direction it shall force hot or cold air through the grain, or that when the motion of the fan is reversed the air in the drying-chamber shall be withdrawn through the heating-pipes.

My invention is more particularly designed for granaries, warehouses, mills, or distilleries, where grain is kept in large quantities in bulk, and is particularly effective where dampness is generated in the grain from its location, or when it has been dampened before being stored.

I construct a pipe, A, of the length and dimensions required for the size of the granary in which my invention is to be applied; and I perforate this pipe, as at *a a*, in as many places as may be found necessary to distribute the air from the pipe freely to the mass of grain by which it is covered. I surround this pipe with a covering, B, of wire-gauze over every part that is placed in the drying-chamber or granary, or bin where it can be used, adapting its length and form to the form of the chamber; for it is indifferent to my invention whether the wire-gauze-covered pipes be arranged in spirals, coils, or parallel lines, vertically or horizontally in the chamber, and when placed the grain to be dried can be thrown from the conveyers, or otherwise, directly into the drying-chamber, so as completely to cover the drying-pipe and be in part directly resting against the wire-gauze with which the pipe is covered. But it is obviously best to so arrange the position and length of the wire-gauze-covered pipe as to admit laborers to use the scoop in removing the grain without striking the pipes; and it is manifest that the bottom of the drying-chamber could be advantageously arranged with such an inclination as would cause the grain to slide, from its own gravity, to a point whence conveyers could take it to the stones, the railroad-car, or the ship, for grinding or for transportation. One end of this wire-gauze-covered pipe is open and communicates to the air on the outside of the drying-chamber, the other end being attached at C to the air-heating pipe D, which is connected with the fan E, a valve, F, being placed between the point of connection and the fan to close or open the pipe D at pleasure.

I form my air-heating pipe D of any suitable refractory material. In most positions cast or wrought iron may be advantageously employed; but as it has not much pressure to resist it may obviously be made of fire-clay, which would possess the necessary resistance to varying degrees of heat, and be very durable as well as economical.

For the use of mills or distilleries using steam-power or warehouses using steam-hoisting apparatus, my heating-pipe may obviously be placed in the boiler-furnace, as shown in Fig. 1.

In form my air-heating tube may be made round, polygonal, or square, but must be of larger diameter in the center than at the ends, as shown in the drawings, and may consist of two frustums of hollow cones united at their base, the object being to have the cold air, when driven into the pipe D by the fan E, rarefy rapidly by contact with a larger area of heated pipe, and escape to the drying-pipes with an accelerated velocity beyond that given by the fan, for thus a short heating-pipe can be made effective in drying large masses of grain rapidly, and this is quite important when an independent fire is to be used in drying grain, as must be the case when a furnace is not used for other purposes in connection with grain drying.

In the arrangement of my blowing apparatus a fan or bellows may be used with equal advantage and driven by any suitable power. As shown in the drawings, I have placed the fan E about the center of the outside of the furnace and arranged it on a pipe, G, to drive the air heated in the pipe D through the pipe B, placed in the drying-chamber. When the valve F is opened in the direction of the red arrows, and when the valve F is closed, the fan will drive a current of cold air, entering it through proper openings, $f\,f'$, in its side, the slide $g$ being raised; or an independent pipe, H, when its valve $h$ is opened, may admit the air to the fan from without the building through the pipe K, its valve $k$ being opened, into the drying-chamber to cool the grain after being dried by the hot air previously driven through the pipe D.

It is obvious that by reversing the motion of the fan and closing the valve F and the slide $g$, and opening the valves $k$ and $i$, the air from the drying-chamber can be drawn through the grain in the direction of the blue arrows and discharged through the pipe H, and thus the grain can be rapidly cooled for immediate use or transportation.

The operation of my invention is as follows: A fire being made in the furnace under the heating-pipe and the fan set in motion, the valve F being open, and the valve $k$ and slide $g$ being closed, a current of hot air will be driven through the heating and drying pipes and diffused equally through the grain resting over, around, and upon the wire-gauze-covered pipe, and as the hot air passes from the pipe through the wire-gauze its heat will be so diffused by passing through the meshes of the gauze covering of the pipes as not to scorch the grain or even change its color; and when the grain is sufficiently dry the valve F may be closed, the valve $k$ and slide $g$ opened, when the fan will drive a current of cold air through the wire-gauze-covered pipes and rapidly cool the grain so as to be in a condition to be ground at once or loaded for transportation.

In very damp weather it may be better to draw the heated air from the drying-chamber rather than drive a current of fresh cool air through it, and then the valve F and slide $g$ being closed, the valves $k$ and $i$ opened, and the motion of the fan reversed—this reversed motion only requiring the driving-belt to be crossed—the air will be drawn from the drying-chamber through the grain and discharged through the pipe H, and thus the grain will be cooled without condensing the air in the mass, and be ready for grinding or shipment at once.

I have described my invention as adapted to drying grain, for it is the best method known to me for this purpose; but it may obviously, with equal advantage, be used for lumber, paper, or any other article of commerce.

What I claim as my invention, and desire to secure by Letters Patent, is—

1. Covering pipes for drying grain with wire-gauze, substantially in the manner and for the purpose set forth.

2. The employment of air-heating pipes for grain-driers having a diameter larger in the center than at the ends, substantially as and for the purpose described.

3. The combination and arrangement, substantially as described, of the fan, the heating and the drying pipes, for the purpose set forth.

4. The method herein described of drying grain by alternate currents of hot and cold air, substantially in the manner described.

In testimony whereof I have hereunto subscribed my name.

S. GODFREY.

Witnesses:
J. A. McCoy,
R. M. Pinkney.